United States Patent
Nemecek

(10) Patent No.: US 6,957,180 B1
(45) Date of Patent: Oct. 18, 2005

(54) SYSTEM AND A METHOD FOR COMMUNICATION BETWEEN AN ICE AND A PRODUCTION MICROCONTROLLER WHILE IN A HALT STATE

(75) Inventor: Craig Nemecek, Seattle, WA (US)

(73) Assignee: Cypress Semiconductor Corp., San Jose, CA (US)

( * ) Notice: Subject to any disclaimer, the term of this patent is extended or adjusted under 35 U.S.C. 154(b) by 576 days.

(21) Appl. No.: 09/998,834

(22) Filed: Nov. 15, 2001

(51) Int. Cl.[7] .......................... G06F 9/455; G06F 9/44; H02H 3/05
(52) U.S. Cl. .......................... 703/28; 714/31; 717/134
(58) Field of Search ............ 717/124–135; 703/23–28; 714/30–31, 34

(56) References Cited

U.S. PATENT DOCUMENTS

| | | | | |
|---|---|---|---|---|
| 5,546,562 A | * | 8/1996 | Patel ........................... | 703/14 |
| 5,587,957 A | * | 12/1996 | Kowalczyk et al. ... | 365/230.03 |
| 5,590,354 A | * | 12/1996 | Klapproth et al. ............ | 714/30 |
| 6,161,199 A | * | 12/2000 | Szeto et al. .................... | 714/30 |
| 6,385,742 B1 | * | 5/2002 | Kirsch et al. .................. | 714/39 |
| 6,564,179 B1 | * | 5/2003 | Belhaj .......................... | 703/26 |
| 6,718,294 B1 | * | 4/2004 | Bortfeld ....................... | 703/20 |
| 2003/0056071 A1 | * | 3/2003 | Triece et al. ................ | 711/165 |

* cited by examiner

*Primary Examiner*—Anthony Nguyen-Ba
(74) *Attorney, Agent, or Firm*—Wagner, Murabito & Hao LLP

(57) ABSTRACT

A system where a production microcontroller is partially copied in a FPGA of an ICE to form a virtual microcontroller. The virtual microcontroller and the production microcontroller simultaneously and independently run a microcontroller code to be debugged at a high frequency. The debugging logic can substantially reside in the ICE and the ICE can perform all debugging functions. The debug interface, residing in the production microcontroller, can enable the production microcontroller to communicate with the ICE in low frequencies. The production microcontroller may request the ICE to lower its frequency when the production microcontroller encounters a halt due to outside events. A user may command resumption of the operation of both the production microcontroller and the virtual microcontroller when debugging of the codes is completed.

21 Claims, 3 Drawing Sheets

SYSTEM AND A METHOD FOR COMMUNICATION BETWEEN AN ICE AND A PRODUCTION MICROCONTROLLER WHILE IN A HALT STATE

FIELD OF INVENTION

This invention relates generally to the field of in circuit emulation (ICE). More specifically an embodiment of the present invention relates to the data communication between a microcontroller on a test circuit and a copy of the microcontroller in an ICE unit while debugging a microcontroller code.

BACKGROUND OF THE INVENTION

In circuit emulation (ICE) has been used by software and hardware developers for a number of years as a development tool to emulate the operation of complex circuit building blocks and permit diagnosis and debugging of hardware and software. Such in circuit emulation is most commonly used to analyze and debug the behavior of complex devices such as microcontrollers and microprocessors that have internal structures that are far too complex to readily model using computer simulation software alone.

FIG. 1 illustrates an exemplary conventional in-circuit emulation arrangement 100 used to model, analyze and debug the operation of a microcontroller device. In this arrangement, a host computer (e.g., a personal computer) 110 is connected to a debug logic 120 which is further connected to a special version of the microcontroller device that has been developed specially for use in emulation. Traditionally, a microcontroller manufacturer would manufacture two versions of any one of its microcontrollers, a special version and a production version. The special version of a microcontroller is only used for the purpose of debugging a microcontroller code, which is eventually loaded in the production version of the same microcontroller.

Debugging operation starts with the host computer 110 loading instructions through debug logic block 120 to the special version of the microcontroller 130 as the instructions are executed. Depending upon the application, this operation may be monitored while the special version of the microcontroller 130 is interconnected with the circuitry that is intended to interface a production version of the microcontroller in the finished product under development. Such interconnection may be via simulation within the host computer 110 or as actual circuitry or some combination thereof. As the circuit is stepped through its operation, the debug logic gathers information about the state of various components of the microcontroller 130 during operation and feeds that information back to the host computer 110 for analysis.

During the course of the analysis, various trace information such as time stamps, register value, data memory content, etc., may be logged in the host computer 110 for analysis and debugging by the designer. Additionally, it is generally the case that various break points can be defined by the designer that cause the program to halt execution at various points in the operation to permit detailed analysis. Other debugging tools may also be provided to enable the user to debug the operation of the circuit.

Typically during the debugging process a designer would prefer to run the microcontroller in as much of a real world situation as possible. Therefore, a special microcontroller is installed in a test circuit, which closely resembles the hardware that is to be controlled by the microcontroller.

In circuit emulation systems such as 100 have a number of disadvantages and limitations. Firstly, an IC manufacturer needs to manufacture two versions of a microcontroller, a special version and a production version. The special version of the microcontroller include a central processing unit (CPU), random access memory (RAM), Read only memory (ROM), flash memory, peripheral functions, a debugging circuit and logic to execute input/output functions. Such a microcontroller with all the elements requires a substantial amount of silicon space in a chip. Silicon space in manufacturing an IC is of premium and care must be taken to optimize the use of silicon space. Secondly, the normal operation of such a microprocessor with debugging logic and memory elements is conducted in a high frequency environment, which in and of itself requires added I/O logic and takes up more silicon space which can be converted to added cost of manufacturing. Thirdly, the cost and time of designing two different chips and also the cost of manufacturing two different versions for all different categories of microcontrollers is prohibitive.

Therefore, a need exists to run the debugging process at high frequency and to minimize the space required by the debugging logic in a microcontroller. Also, a need exist to enhance the efficiency of the input output operation in a microcontroller when a microcontroller need not run at high frequency. Another need exist to improve communication of data between the microcontroller under testing condition and the in circuit emulator when the microcontroller is being debugged. The present invention provides a novel solution to these requirements.

SUMMARY OF THE INVENTION

Accordingly, in one embodiment of the present invention debugging logic, trace buffers and break point logic, which conventionally reside in a microcontroller, are placed in an in circuit emulator's FPGA. Another embodiment of the present invention discloses a production microcontroller including a standard microcontroller, a limited number of pins and a sufficient number of gates to enable the production microcontroller to communicate data with an ICE at a low frequency. According to this embodiment of the present invention, substantially all debug logic is built into the ICE and the ICE performs all debugging functions of a production microcontroller. According to another embodiment of the present invention, a production microcontroller does not include debug logic, and all debugging functions are performed in the ICE. Removing all debug logic, trace buffers, and breakpoint logic from a production microcontroller results in a substantially less requirements for silicon area in the manufacture of a production microcontroller.

Another embodiment discloses a method for debugging a microcontroller code comprising the steps of running a microcontroller code on a production microcontroller and an ICE simultaneously. A user requests the production microcontroller and the ICE to operate at a lower frequency from an original frequency, where the production microcontroller and the ICE can establish data communication. The user requests data from the production microcontroller, and when data is received and code is debugged the original frequency is restored.

A system where a production microcontroller is partially copied in a FPGA of an ICE to form a virtual microcontroller. The virtual microcontroller and the production microcontroller simultaneously and independently run a microcontroller code to be debugged at a high frequency. The debugging logic can substantially reside in the ICE and the ICE can performs all debugging functions. The debug interface, residing in the production microcontroller, can enable the production microcontroller to communicate with the ICE in low frequencies. The production microcontroller may request the ICE to lower its frequency when the production microcontroller encounters a halt due to outside events. A user may command resumption of the operation of both the production microcontroller and the virtual microcontroller when debugging of the codes is completed.

These and other objects and advantages of the present invention will no doubt become obvious to those of ordinary skill in the art after having read the following detailed description of the preferred embodiment which are illustrated in the various drawing figures.

BRIEF DESCRIPTION OF THE DRAWINGS

The accompanying drawings, which are incorporated in and form a part of this specification, illustrate embodiment of the invention and, together with the description, serve to explain the principles of the invention.

DETAILED DESCRIPTION OF THE PREFERRED EMBODIMENTS

Figure 1:
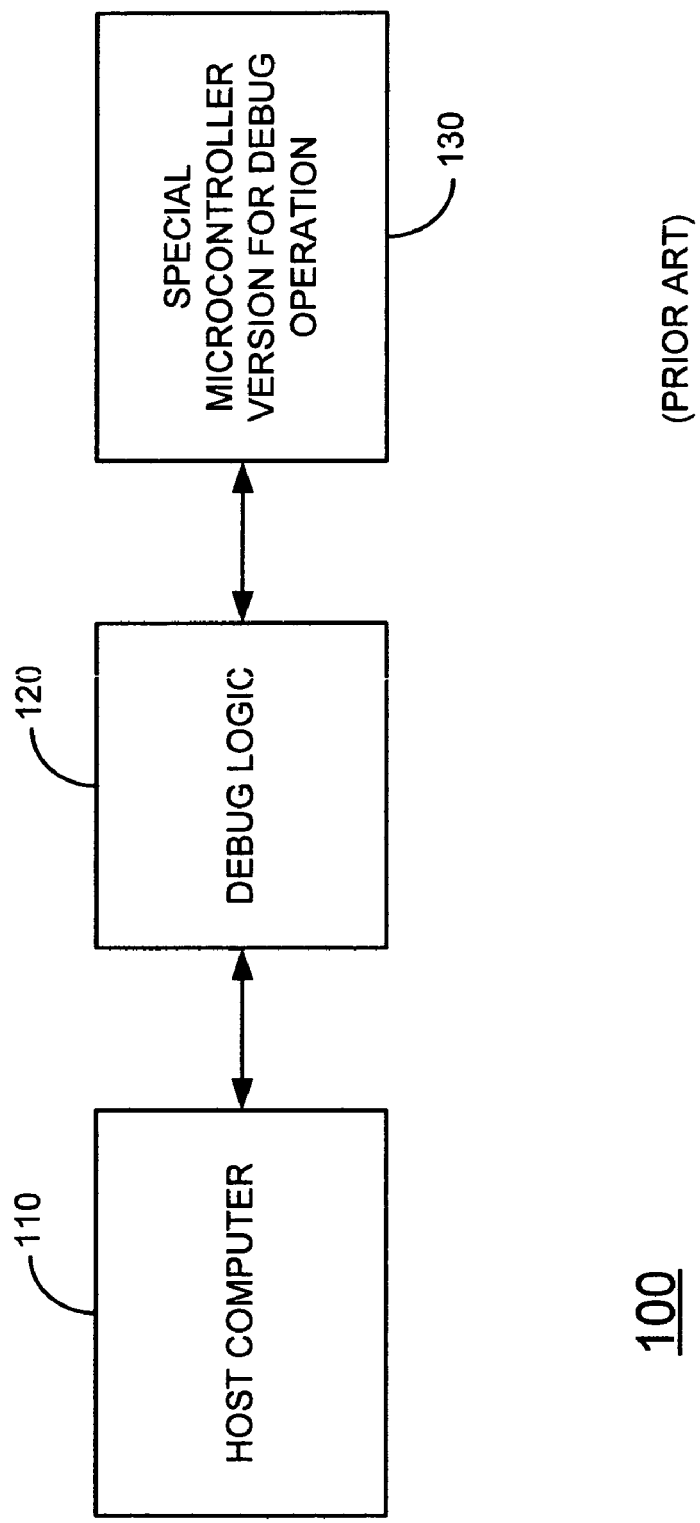
FIG. 1 (Prior Art) is a block diagram of a conventional in circuit emulator (ICE).

Reference will now be made in detail to preferred embodiment of the invention, a system and a method for CPU clock throttle for halt state, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents, which may be included within the spirit and scope of the invention as defined by the appended claims. Furthermore, in the following detailed description of the present invention, numerous specified details are set forth in order to provide a thorough understanding of the present invention. However, it will be obvious to one of ordinary skill in the art that the present invention may be practiced without these specific details. In other instances, well known methods, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed steps, logic block, process etc., is here, and generally, convinced to be self consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be those associated with the appropriate physical quantities and are merely convenient labels applied to those quantities. Unless specifically stated otherwise as apparent from the following discussions, it is appreciated that throughout the present invention, discussion utilizing terms such as "processing" or "transferring" or "executing" or "determining" or "instructing" or "issuing" or "halting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Method and System of the Invention

While this invention is susceptible of embodiment in many different forms, there is shown in the drawings and will herein be described in detail specific embodiment, with the understanding that the present disclosure is to be considered as an example of the principles of the invention and not intended to limit the invention to the specific embodiment shown and described. In the description below, like reference numerals are used to describe the same, similar or corresponding parts in the several views of the drawings.

A commercial ICE system utilizing the present invention is available from Cypress Micro Systems, Inc., for the CY8C25xxx/26xxx series of microcontrollers. Detailed information regarding this commercial product is available from Cypress Micro Systems, inc., 22027 $17^{th}$ Avenue SE., Suite 201 Bothell, Wash. 98021 Bothel, Wash. in the form of version 1.11 of "PsoC Designer: Integrated Development Environment User Guide", which is hereby incorporated by reference. While the present invention is described in terms of an ICE system for the above exemplary microcontroller device, the invention is equally applicable to other complex circuitry including microprocessor and other circuitry that is suitable for analysis and debugging using in-circuit emulation. Moreover, the invention is not limited to the exact implementation details of the exemplary embodiment used herein for illustrative purposes.

Figure 2:
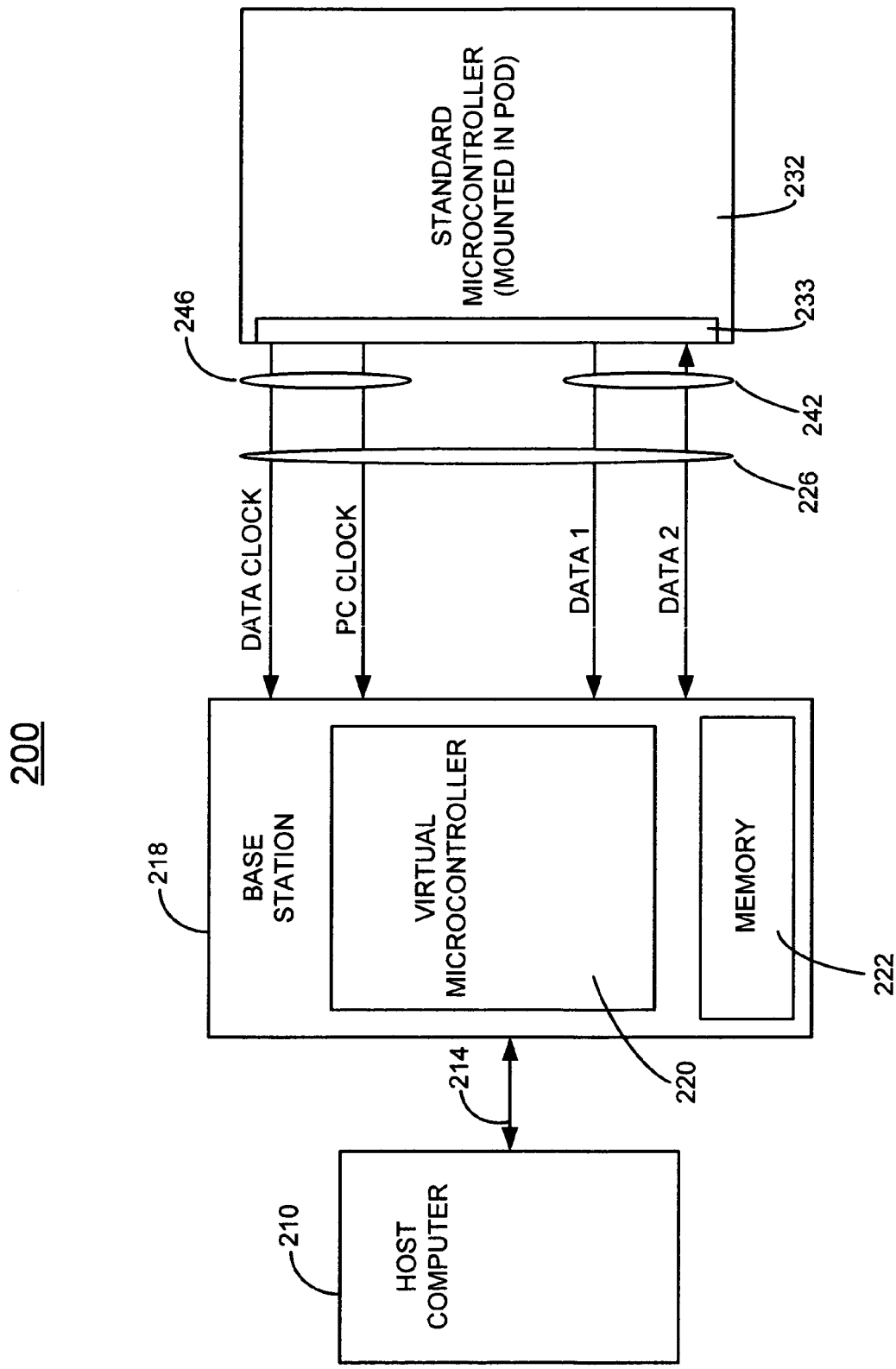
FIG. 2 is a block diagram of an exemplary in circuit emulation system consistent with certain microcontroller embodiments of the present invention.

Referring now to FIG. 2, an architecture for the implementation of an embodiment of an ICE system of the present invention is illustrated as system 200. In system 200, a host computer 210 (e.g., a personal computer based on a Pentium™ class microprocessor) is interconnected (e.g., using a standard PC interface 214 such as a parallel printer port connection, a universal serial port (USB) connection, etc.) with a base station 218. The host computer 210 generally operates to run an ICE computer program to control the emulation process and further operates in the capacity of a logic analyzer to permit a user to view information provided from the base station 218 for use in analyzing and debugging a system under test or development.

The base station 218 is based upon a general purpose programmable hardware device such as a gate array configured to function as a functionally equivalent "virtual microcontroller" 220 (or other device under test (DUT)). This is accomplished using an associated integral memory 222 which stores program instructions, data, trace information and other associated information. Thus, the base station is configured as an emulator of the internal microprocessor portion of the microcontroller 232. In preferred embodiments, a field programmable gate array FPGA (or other programmable logic device) is configured to function as the virtual microcontroller 220. The FPGA and virtual microcontroller 220 will be referred to interchangeably herein. The base station 218 is coupled (e.g., using a four wire interface 226) to a standard production microcontroller 232 mounted in a mounting device referred to as a "pod" via a debug interface 233. The pod, in certain embodiments, provides connection to the microcontroller 232 that permit external probing as well as interconnection with other circuitry as might be used to simulate a system under development.

The FPGA of the base station 218 of the current embodiment is designed to emulate the core processor functionality (microprocessor functions, Arithmetic Logic Unit function, RAM, and ROM memory functions) of the Cypress CY8C25xxx/26xxx series microcontrollers. The CY8C25xxx/26xxx series of microcontroller also incorporate limited I/O functions and an interrupt controller as well as programmable digital and analog circuitry. This circuitry need not be modeled using the FPGA 220. Instead the I/O read information, interrupt vector and other information can be passed to the FPGA 220 from the microprocessor 232 over the debug interface 233, which resides on pod, and interface 226 as will be described later.

In one embodiment of the present invention substantially all debug logic, which traditionally existed in production microcontroller 232, are built into FPGA 220 and associated circuitry of the base station 218. Thus, FPGA 220 has operational functionality identical to that of microprocessor portion of a production microcontroller.

The base station 218's virtual microcontroller 220 operates to execute the code programmed into the microcontroller 232 in lock-step operation with the microcontroller 232. Thus, the actual microprocessor 232 is freed of any need to provide significant special facilities for ICE, since any such facilities can be provided in the virtual microcontroller 220. The base station 218's virtual microcontroller 220 and microcontroller 232 execute all steps of the program under test in lock step without a need to communicate except when a break point or a halt state is encountered. The combination of real and virtual microcontroller behaves just as the microcontroller 232 would alone under normal operation conditions. I/O reads and interrupts vectors are transferred from the microcontroller 232 to the base station 218 in a lower speed as will be described later. Base station 218 is then able to provide the host computer 210 with the I/O reads and interrupts vectors as well as an array of information internal to the microcontroller 232 within memory and register locations that are otherwise inaccessible.

In the designing of a microcontroller other complex circuit such as the microcontroller 232, it is common to implement the design using the Verilog™ language (or other suitable language). Thus, it is common that the full functional design description of the microcontroller is fully available in a software format. The base station 218 of the current embodiment is based upon the commercially available Spartan™ series FPGAs from Xilinx, inc., 2100 Logic Drive, San Jose, Calif. 95124. The Verilog™ description can be used as the input to the FPGA design and synthesis tool available from the FPGA manufacturer to realize the virtual microcontroller 220 (generally after timing adjustments and other debugging). Thus, design and realization of the FPGA implementation of an emulator for the microcontroller (virtual microcontroller) or other device can be achieved by use of Verilog description along with circuitry to provide interfacing to the base station and the device under test (DUT).

In the embodiment described in connection with FIG. 2, the actual production microcontroller 232 carries out its normal functions in the intended application and passes I/O information and other information needed for debugging to the FPGA 220 only at a break point or in halt state and when both virtual microcontroller 220 and production microcontroller are operating at low frequency. The virtual microcontroller 220 implemented within the FPGA of base station 218 serves to provide the operator with visibility into the core processor functions that are inaccessible in the production microcontroller 232. Thus, the FPGA 220, by virtue of operating in lock-step operation with the microprocessor 232 provides an exact duplicate of internal registers, memory contents, interrupt vectors and other useful debug information. Additionally, memory 222 can be used to store information useful in trace operations that is gathered by the FPGA 220 during execution of the program under test. This architecture, therefore, permits the operator to have visibility into the inner working of the microcontroller 232 without need to provide special boundouts and expensive circuitry on the microcontroller itself.

The base station 218's FPGA based virtual microcontroller 220, operating under control of host computer 210, carries out the core processor function of microcontroller 232 and thus contains a functionally exact emulated copy of the contents of the registers and memory of the real microcontroller 232. The ICE system starts both microcontrollers (real and virtual) at the same time and keeps them running in synchronization. Whenever the system is halted (i.e., when the system is not emulating), either production microcomputer 232 requests ICE to drop its operating frequency to a lower frequency or ICE drops its frequency, when ICE encounters a break point, and ICE requests for information from production microcontroller 232 such as programming functions, test functions, register content etc.

For example, when standard microcontroller 232 and virtual microcontroller 220 are running a microcontroller code, the execution of the code is in lock step and it is conducted at a high frequency. In other words the two microcontrollers are running the same code, they start running the code at the same time, they hit the same break point and at the same frequency. If due to some external event on the test circuit the production microcontroller is 232 halted, it immediately sends a signal to the ICE 218 and request ICE 218 to stop running the code. ICE 218 stops running the code. At this time both ICE 218 and the production microcontroller 232 are at the same line of code and ideally should have the same memory and register contents. To begin the debugging process, ICE requires information about the contents of the memory 222 and the contents of the registers in the production microcontroller. ICE 218 sends a signal to the production microcontroller 232 over the interface 226 and request information on the content of the production microcontroller's memory and register content. The dialogue between the ICE 218 and the production microcontroller 232 is when the execution of the code is halted and there is no need for high-speed communication. Therefore, request for information and response to the request can be done is much slower speed (e.g., 3 Mhz) which can be done with minimum I/O logic at the debug interface. This is a major advantage to IC manufacturer because a production microcontroller can be produced with a minimum use of silicon space for I/O operation.

Debug interface 233, which performs I/O operation of the production microcontroller 232, has a limited I/O capability. Production microcontroller 232 normally operates at a high frequency when running a microcontroller code and has no need to communicate with ICE. Execution of the microcontroller code in the production microcontroller 232 is at high speed and at exactly the same speed as the speed of execution in the ICE. Because communication between the production microcontroller and ICE takes place, debug software in the host computer request ICE to lower its frequency to approximately 3 Mhz. Because all complex I/O logic and debug logic are no longer in the production microcontroller, it is at this low frequency that ICE can communicate with the real microcontroller. The host software causes the standard microcontroller 232 to send data information which may be the content of its registers or other data not otherwise available to the user over the interface line 226 to the ICE for debugging and analysis. Both virtual and real microcontroller are operating at 3 Mhz when transfer of data across the interface cable and through debug interface takes place. Once the debugging is completed, the user may issue a command to both real and virtual microcontroller to resume their testing of the code at the original frequency.

Similarly, when a break point is encountered, ICE 218 lowers its frequency to 3 Mhz and request data from the production microcomputer 232 installed on the pod. Production microcomputer 232 responds to the command by sending the requested data which may be the content of its registers or other data not otherwise available to the user. Once the debugging is completed, host computer software may issue a command to both virtual and production microcontroller to resume their operation when the debugging and analysis is completed.

Because the microprocessor 232 operates in synchronization with the virtual microcontroller 220, less data needs to be sent over the four-wire interface than would be required in an ICE system otherwise. The type of data sent over the lines is allowed to change depending on when the data is sent in the execution sequence. In other words, depending on the execution sequence time, the information over the data lines can be commands directed to the production microcontroller 232 or it can be data requested by the ICE 218. Since the debugging functions and I/O logic are placed in ICE 218 and data transfer is conducted at low frequency, as discussed previously, a substantial saving in silicon space will be realized. Moreover, because of the lock-step operation of the production microcontroller 232 and the virtual microcontroller 220, the virtual microcontroller 220 does not require certain resources of the microcontroller 232 such as timers, counters, amplifiers, etc. since they are fully implemented in the production microcontroller 232.

In the embodiment illustrated, the basic interface used is a four line interface between microcontroller 232 and base station 218. This interface permits use of a standard five wires Category Five patch cable to connect the microcontroller 232 and base station 218 in one embodiment, but of course, this is not to be considered limiting. The four wire interface 226 of the present embodiment can be functionally divided into two functional portions. A data transport portion 242 carries two data lines in the current embodiment. A clock portion 246 carries a data clock plus the microcontroller clock signal for the microcontroller 232. Three additional lines are also provided (not shown) for supply, ground and reset line. But, the data transport portion 242 and the clock portion 246 are of primary interest, since the supply and reset functions can be readily provided in any other suitable manner.

The two portions of the interface are implemented in the current embodiment using four lines as described, however, in other embodiments, these two portions can be implemented with as few as two wires. In the current embodiment, the microcontroller clock signal can be varied by programming (even dynamically during execution of a program). Therefore, it is desirable to have two clock signals-microcontroller clock to easily track the microcontroller clock timing as well a system clock that regulates the data transfer and other operations. However, in other embodiments, particularly where a clock frequency is not changed dynamically, a single clock can be used. The single clock can be multiplied or divided as required to implement the required clocking signal.

The present embodiment using an eight bit microcontroller that only reads eight bits at a time on any given I/O read. Thus, the present microcontroller 232 needs only to effect serializing and transferring a maximum of one eight bit I/O read for each instruction cycle. This is easily accommodated using two data lines transferring four bits each over four system clock cycles. However, using a clock, which is two times faster, a single line could equally well transfer the data in the same time. Similarly, four lines could be used to transfer the same data in a short enough time to permit the virtual microcontroller 220 to process the data and issue any needed response before the next instruction cycle begins. The time required to accomplish this is held at a minimum in the present invention, since the system synchronization eliminates need for any overhead protocol for transmission of the data.

The current embodiment of the invention uses a four line communication interface and method of communication between the FPGA within base station 218 (acting as a "virtual microcontroller"220 or ICE) and the real microcontroller device under test (microcontroller 232). The four line communication interface is time-dependent so that different information can be transferred at different times over a small number of communication lines. Moreover, since the two processors operate in lock-step, there is no need to provide bus arbitration, framing, or other protocol overhead to effect the communication between the microcontroller 232 and the virtual microcontroller 220. This interface is used for, among other things, transferring of I/O data from the microcontroller 232 to the FPGA 220 (since FPGA emulates only the core processor functions of the microcontroller in the current embodiment). A first interface line (data1) is a data line used by the microcontroller 232 to send I/O data to FPGA based virtual microcontroller 220. This line is also used to notify the FPGA 220 of pending interrupts. This data1 line is only driven by the real microcontroller 232. A second data line (Data2), which is bi-directional, is used by the microcontroller 232 to send I/O data to FPGA based virtual microcontroller of base station 218. In addition, the FPGA 220 uses the Data2 line to convey halt requests (i.e., to implement simple or complex breakpoints) to the microcontroller 232.

A third interface line is a 24/48 Mhz data clock used to drive the virtual microcontroller 220's communication state machines (the logic used within the state controller to communicate with the microcontroller232). In the current embodiment, this clock always runs at 24 Mhz unless the microcontroller 232's internal clock is running at 24 Mhz. In this case the system clock switches to 48 Mhz. Of course, these exact clock speeds are not to be considered limiting, but are presented as illustrative of the current exemplary embodiment. The fourth interface line is the internal microcontroller clock from the microcontroller 232.

A fifth line can be used to provide a system reset signal to effect the simultaneous startup of both microcontrollers. This fifth line provides a convenient mechanism to reset the microcontrollers, but in most environments, the simultaneous startup can also be effected in other ways including switching of power. Sixth and seventh lines are provided in the current interface to provide power and ground for power supply.

The base station 218's virtual microcontroller 220 communicates with the microcontroller 232 via four signal and clock lines forming a part of the four line interface 226 forming a part of a seven wire connection as described below. The interface signals travel over a short (e.g., one foot) of CAT 5 network cable. The ICE transmits break commands to the microcontroller 232 via the base station 218, along with register read/write command when the microcontroller 232 is halted. The microcontroller 232 uses the interface to return register information when halted, and to send I/O read, interrupt, vector, and watchdog information while running. The microcontroller 232 also sends a copy of its internal clocks for the ICE.

Synchronization between the microcontroller 232 and the virtual microcontroller 220 is achieved by virtue of their virtually identical operation. They are both started simultaneously by a power on or reset signal. They then track each other's operation continuously executing the same instructions using the same clocking signals. The system clock signal and the microcontroller clock signal are shared between the two microcontrollers (real and virtual) so that even if the microprocessor clock is changed during operation, they remain in lock step.

In accordance with certain embodiment of the invention, a mechanism is provided for allowing the FPGA 220 of base station 218 and the microcontroller 232 to stop at the same instruction in response to a break-point event (a break or halt). The FPGA 220 has the ability to monitor the microcontroller states of microcontroller 232 for a breakpoint event, due to its lock-step operation with microcontroller 232. In the process of executing an instruction, an internal start of instruction cycle (SOI) signal is generated (by both microcontrollers) that indicates that the device is about to execute a next instruction. If a break point signal (a halt or break signal—the term "halt" and "break" are used synonymously herein) is generated by the FPGA, the execution of the microcontroller 232 can be stopped at the SOI signal point before the next instruction starts.

Although the SOI signal is labeled as a signal indicating the start of an instruction, the SOI signal is used for multiple purpose in the present microcontroller. It is not required that the SOI signal actually indicate a start of instruction for any purpose, merely that there be a convenient time reference on which to base certain actions. For example, any reference signal that always takes place prior to execution of an instruction can be used as a time reference for reading a halt command. Accordingly, any such available or generated reference signal can be used equivalently as a "halt read" signal without departing from the present invention. That not withstanding, the SOI signal is conveniently used in the current embodiment ad will be used as a basis for the explanation that follows, but should not be considered limiting.

Logic within the FPGA 220 of base station 218 allows not only for implementation of simple breakpoint events, but also for producing breakpoints as a result of very complex events. By way of example, and not limitation, a breakpoint can be programmed to occur when a program counter reaches 0x0030, and I/O write is happening and the start pointer is about to overflow. Other such complex breakpoints can readily be programmed to assist in the process of debugging. Complex breakpoints are allowed, in part, also because the virtual microcontroller 220 has time to carry out complex computations and comparisons after receipt of I/O data transfers from microcontroller 232 and before the next instruction commences. After the receipt of I/O data from the microcontroller 232, the FPGA 220 of base station 218 has a relatively long amount of computation time to determine if a breakpoint event has occurred or not. In the event a breakpoint has occurred, the microcontroller 232 can be halted and the host processor 210 is informed.

An advantage of this process is that the FPGA 220 and the microcontroller 232 can be stopped at the same time in response to a breakpoint event. Another advantage is that complex and robust breakpoint events are allowed while still maintaining breakpoint synchronization between the two devices. These advantages are achieved with minimal specialized debugging logic (to send I/O data over the interface) and without special boundout circuitry being required in the microcontroller device under test 232. Normal operation of the current microcontroller is carried out in a cycle of a distinct stage or phase as illustrated in connection with FIG. 3 described below.

Figure 3:
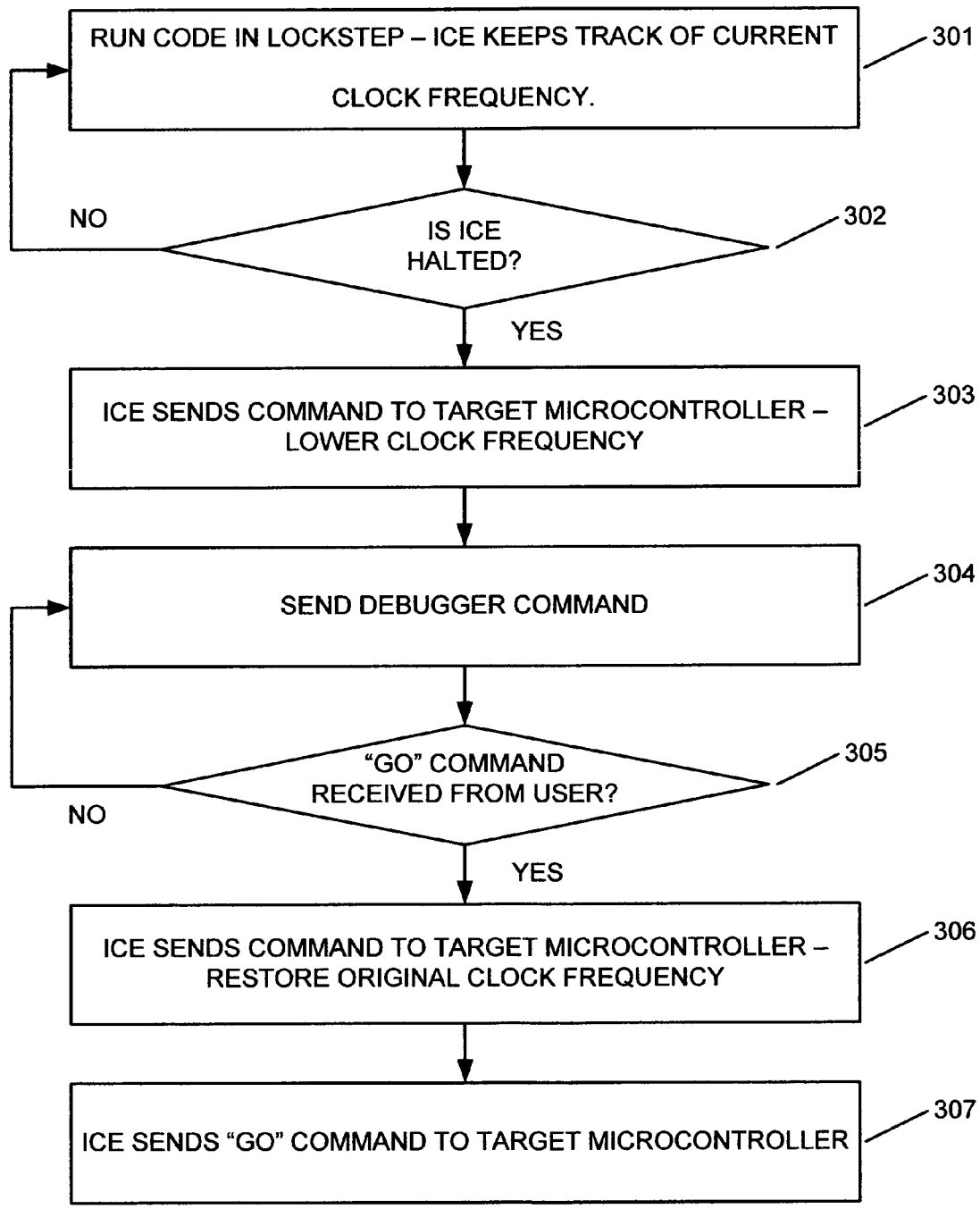
FIG. 3 is an illustration of the operational phases of a debugging process where a virtual microcontroller and a production microcontroller simultaneously run code under test in high frequency and communicate in low frequency.

FIG. 3 is a flow chart of the steps of a microcontroller code debugging process 300 in accordance with one embodiment of the present invention. As depicted in FIG. 3, process 300 shows the steps involved in debugging microcontroller code using a dual operating frequency debug interface data transmission, wherein a debug interface is optimized to implement data transfers at a reduced operating frequency (e.g., low speed) as opposed to a normal operating frequency (e.g., system 200 of FIG. 2).

Process 300 begins in step 301 where microcontroller program code is loaded into a microcontroller (e.g., a target microcontroller) and an ICE, and execution of the code begins with the code running in lock step on both the microcontroller and the ICE. The debugging process begins by initializing a first memory of the ICE and a second memory of the microcontroller with microcontroller test code. This test code typically comprises a microcontroller application requiring testing with multiple microcontroller configurations, settings, conditions, and the like. In step 302, as the microcontroller test code executes, process 300 monitors the execution for the occurrence of a halt. If a halt is encountered, process 300 proceeds to step 303.

In step 303, after the occurrence of a halt, the ICE sends a command to the microcontroller to lower its clock frequency from, for example, a normal operating frequency (e.g., 24 Mhz) to a reduced operating frequency (e.g., 3 Mhz). In step 304, as described above, once the clock frequency is reduced, the debug interface of the microcontroller is capable of transmitting and receiving debugging commands to and from the ICE. The circuits and elements comprising the debug interface are optimized for low speed operation as opposed to normal speed operation, thereby providing a significant cost savings. In step 305, data transmission continues at low speed (e.g., reduced operating frequency) until a go command is received from the user. In step 306, the ICE commands the microcontroller to restore its normal operating frequency. Subsequently, in step 307, the ICE sends a "go" command to the microcontroller to reinitiate execution of the microcontroller test code.

The foregoing descriptions of specific embodiments of the present invention have been presented for purpose of illustration and description. They are not intended to be exhaustive or to limit the invention to the precise form disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An ICE (in circuit emulation) system for debugging microcontroller code comprising:
   a computer system for controlling a debugging process;
   a microcontroller installed on a test circuit, the microcontroller configured to run microcontroller code;
   an ICE coupled to the computer system, wherein the ICE emulates the microcontroller, and wherein the ICE is configured to run the microcontroller code cooperatively with the microcontroller to implement the debugging process; and
   a debug interface included in the microcontroller for communicatively coupling the microcontroller and the ICE, the interface configured to enable data transmission when the microcontroller is operating at a first speed and to disable data transmission when the microcontroller is operating at a second speed, wherein said first speed is slower than said second speed.

2. The system as recited in claim 1 wherein the test circuit is a mounting device.

3. The system as recited in claim 1 wherein the ICE includes a field programmable gate array (FPGA) where the microcontroller is emulated.

4. The system as recited in claim 1 wherein the debug interface performs I/O operations with the ICE for the microcontroller.

5. The system as recited in claim 1 wherein the first speed is 3 Mhz or lower.

6. The system as recited in claim 1 wherein the second speed is 24 Mhz or above.

7. The system as recited in claim 1 further comprising:
   a CAT 5 cable for communicatively coupling the ICE and the debug interface.

8. An ICE (in circuit emulation) method for debugging microcontroller code comprising:
   a) initializing a memory of an ICE and a memory of a microcontroller with microcontroller test code;
   b) executing the microcontroller test code on the microcontroller and on the ICE simultaneously;
   c) decreasing an operating frequency of the microcontroller from a first speed to a second speed, the decreasing commanded by the ICE during an execution halt wherein said second speed is slower than said first speed;
   d) while at the second speed, transmitting debugging commands between the ICE and the microcontroller via a debug interface of the microcontroller; and
   e) increasing the operating frequency from said second speed to said first speed after the debugging commands are transmitted.

9. The method of claim 8 further comprising:
   executing the microcontroller test code on the microcontroller and the ICE in lock step.

10. The method of claim 8 further comprising:
    increasing the operating frequency from said second speed to said first speed after a debugging process implemented by the debugging commands is complete.

11. The method of claim 8 wherein the increase in the operating frequency from said second speed to said first speed is commanded by the ICE.

12. The method of claim 8 further comprising:
    initiating code execution on the microcontroller by transmitting a command from the ICE after increasing the operating frequency from said second speed to said first speed.

13. The method of claim 8 wherein the microcontroller is installed in a mounting device.

14. The method of claim 8 wherein the ICE includes a field programmable gate array (FPGA) for emulating the microcontroller.

15. The method of claim 8 wherein the debug interface performs I/O operations with the ICE for the microcontroller.

16. The method of claim 8 wherein said second speed is 3 Mhz or lower.

17. The method of claim 8 wherein said first speed is 24 Mhz or above.

18. An ICE (in circuit emulation) system for debugging microcontroller code comprising:
    a microcontroller installed on a test circuit, the microcontroller configured to run microcontroller code;
    an ICE including a field programmable gate array (FPGA) for emulating the microcontroller, wherein the ICE is configured to run the microcontroller code in lock step with the microcontroller to implement a debugging process; and
    a debug interface included in the microcontroller for communicatively coupling the microcontroller and the ICE, the interface configured to enable data transmission when the microcontroller is operating at a first speed for transmitting debugging commands between the ICE and the microcontroller via the debug interface, and to disable data transmission when the microcontroller is operating at a second speed after the debugging commands are transmitted wherein said first speed is slower than said second speed.

19. The system as recited in claim 18 wherein the debug interface performs I/O operations with the ICE for the microcontroller.

20. The system as recited in claim 18 wherein the first speed is 3 Mhz or lower.

21. The system as recited in claim 18 wherein the second speed is 24 Mhz or above.

* * * * *